July 23, 1946.    J. H. STARR ET AL    2,404,757
INSTRUMENT BOX
Filed June 6, 1942    5 Sheets-Sheet 4
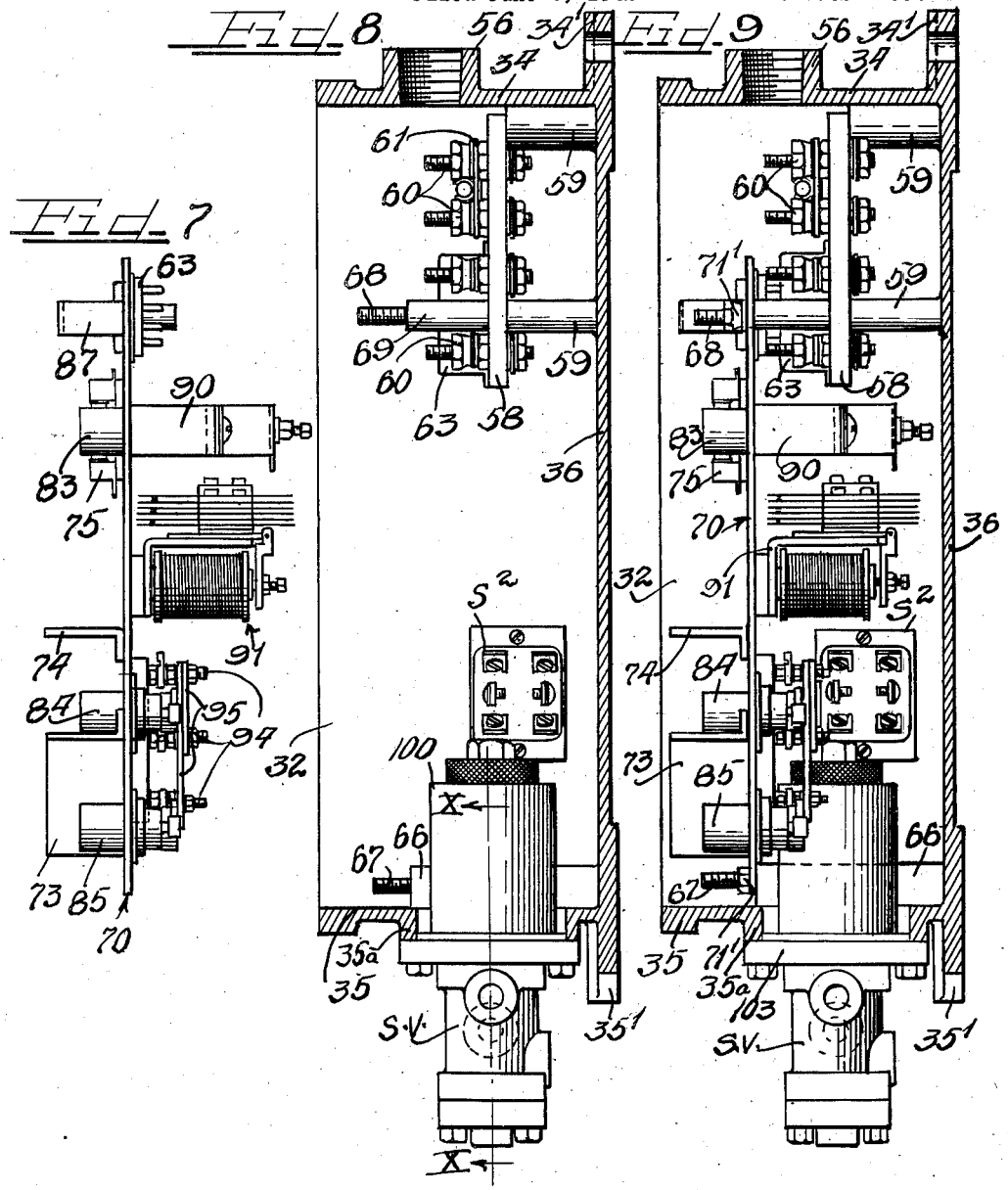
Inventors
James H. Starr
Edward A. Goodnow
Attys.

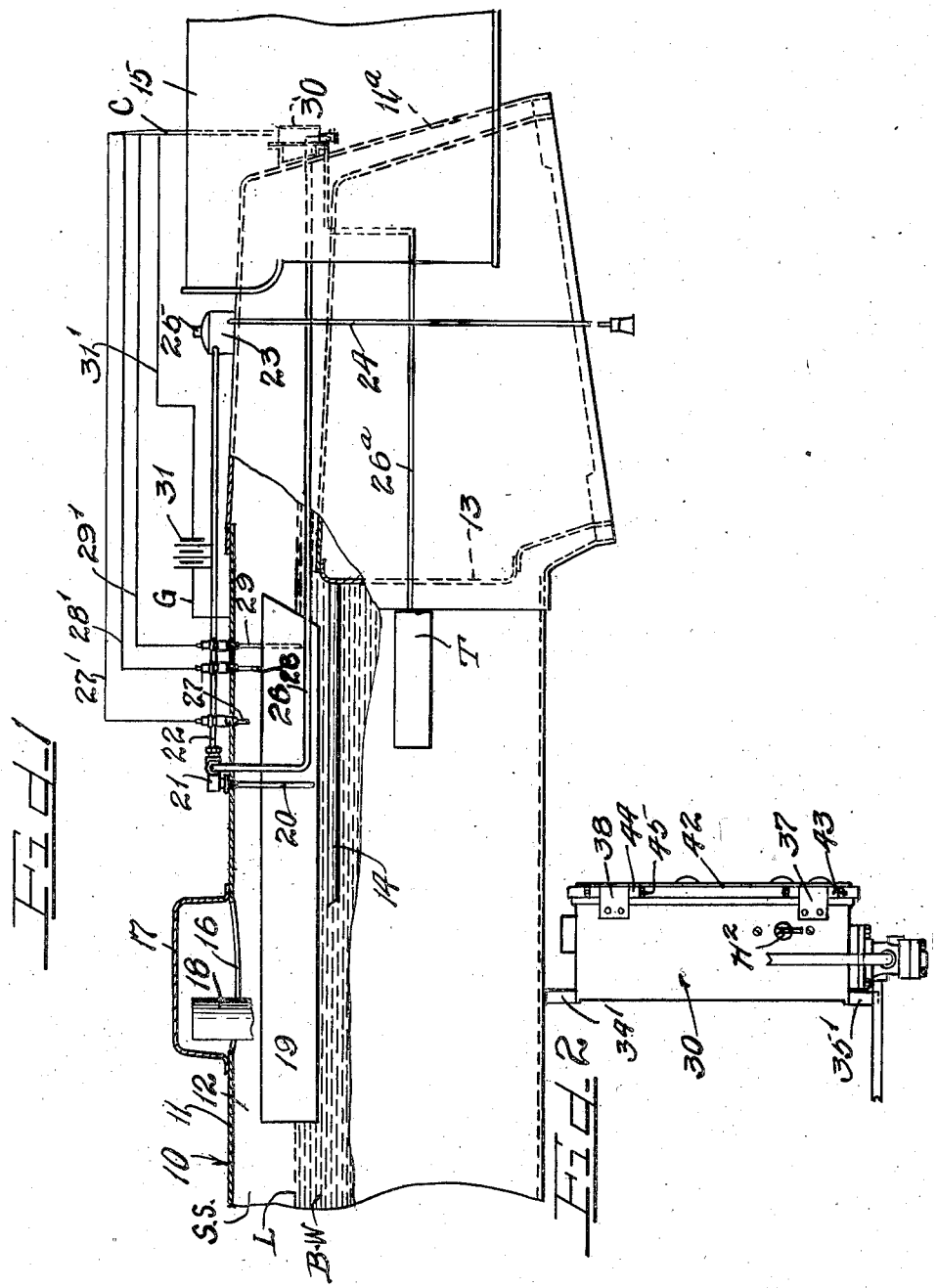

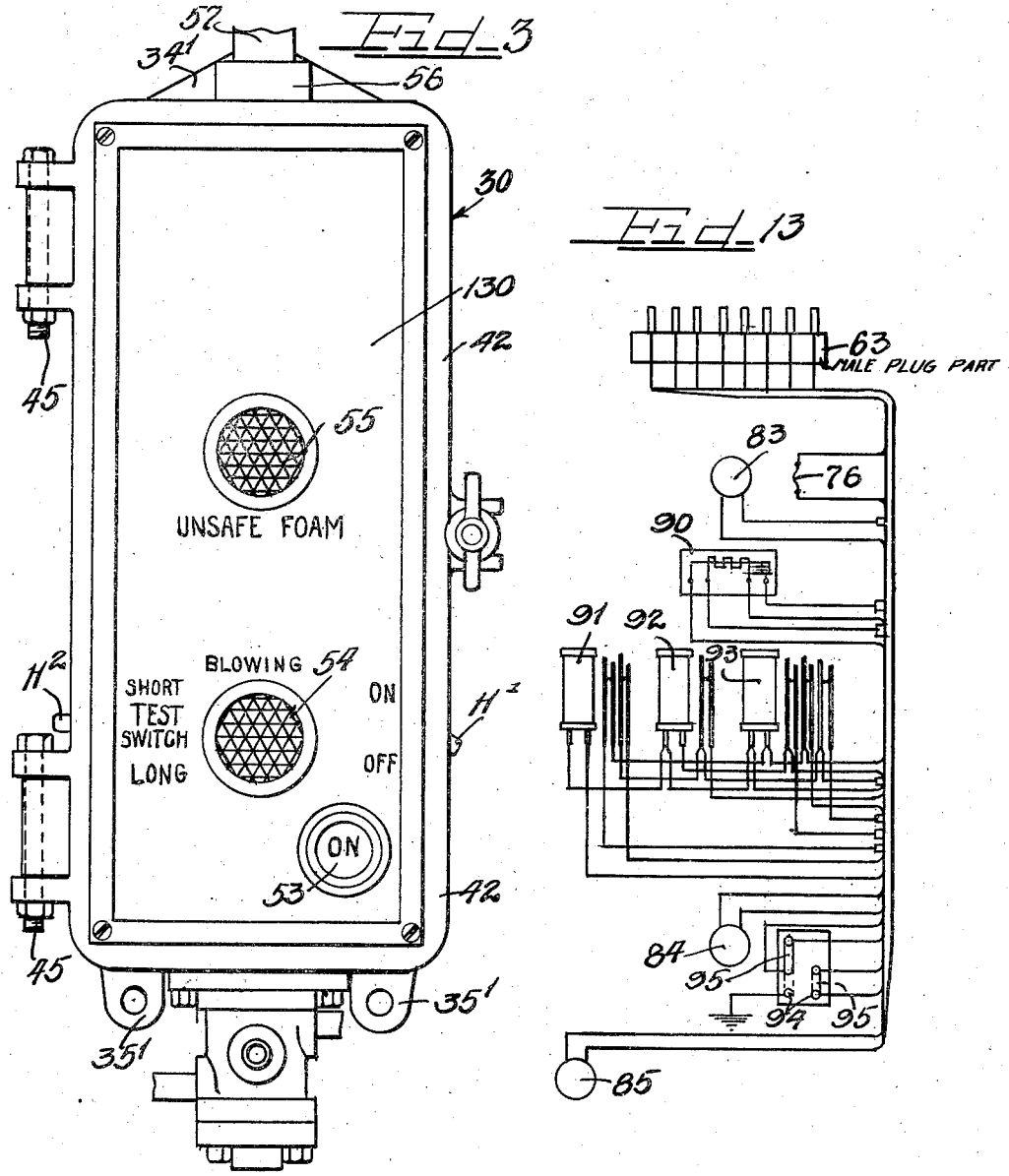

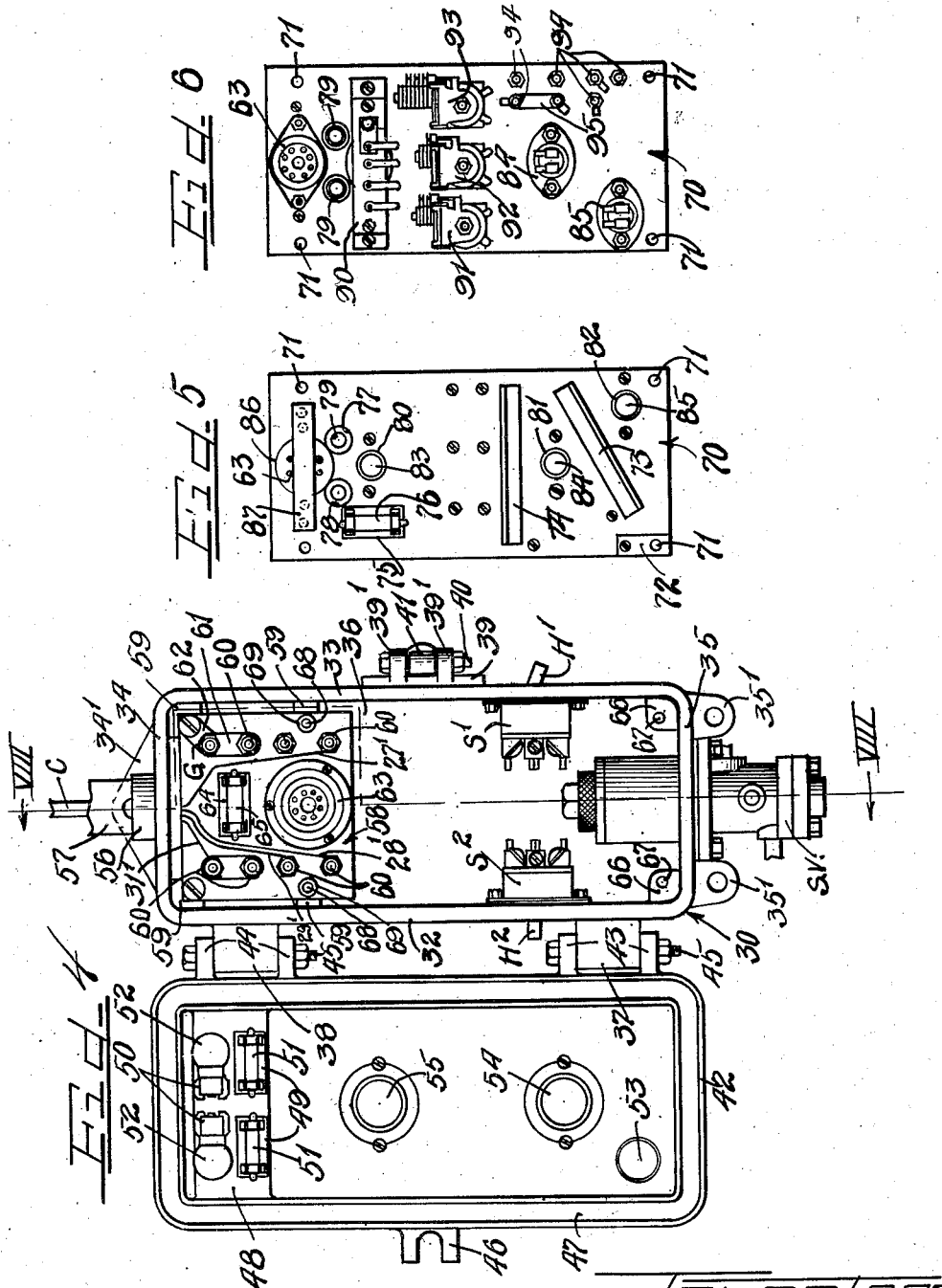

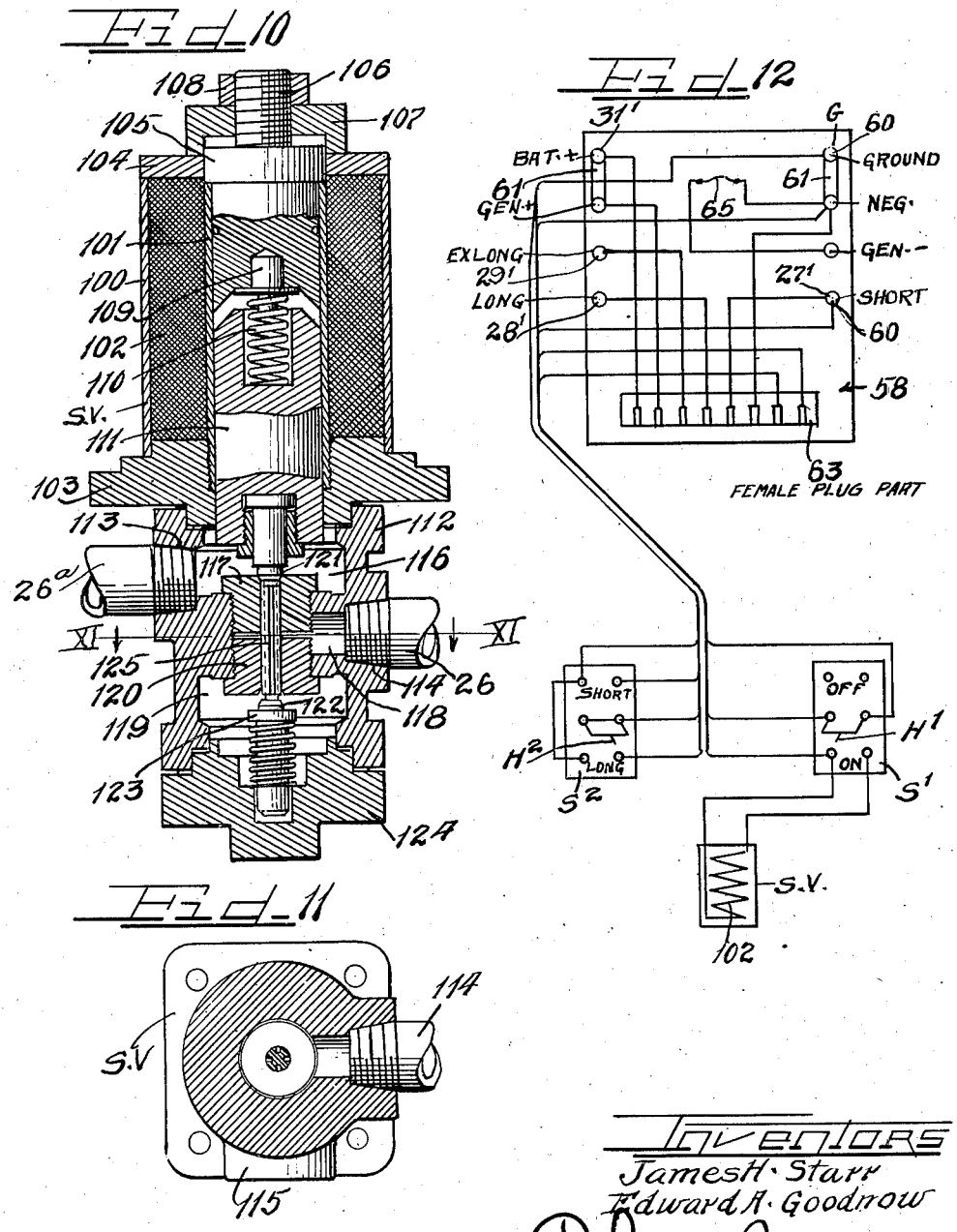

Patented July 23, 1946

2,404,757

UNITED STATES PATENT OFFICE 2,404,757

INSTRUMENT BOX

James H. Starr, La Grange, and Edward A. Goodnow, Glenview, Ill., assignors to Electro-Chemical Engineering Corporation, Chicago, Ill., a corporation of Delaware Application June 6, 1942, Serial No. 446,144

5 Claims. (Cl. 177—311)

This invention relates to an instrument box or terminal box for an electric control circuit.

More specifically the invention relates to a box-like unit suitable for mounting in the engineer's cab of a steam locomotive and containing electrical devices adapted to indicate and automatically control foam conditions within the locomotive boiler.

The box or unit of this invention will be hereinafter specifically described and illustrated in connection with an automatic foam blow-off system for a locomotive boiler, but it is not limited to such preferred use since, for example, the illustrated electrical devices in the box can be rearranged or replaced to control a different type of system. The invention, therefore, includes, within its scope, many different forms of units in addition to the illustrated unit for controlling many different forms of electrical systems in addition to the illustrated system.

A feature of the unit of this invention is its compactness and the arrangement of the parts therein for quick accessibility.

A further feature of the unit is its adaptability for use with different types of systems which is made possible by rearrangement of readily shiftable bus bars or conductor links mounted in the unit.

Another feature of the box is the readily removable panel therein which carries electrical devices adapted to be placed in proper circuit relation with other parts or devices in the box by the mere seating of the panel in the box. The panel can be removed to expose all underlying parts or devices in the box and to give free access to all parts or devices mounted on the panel. The panel, when lifted out of the box, is completely severed from all connection therewith, since no wires need extend between the box mounted parts and the panel mounted parts.

A still further feature of the invention is its readily openable spare parts carrying cover and the light transmitting ports in the cover as well as the wording on the cover which reveal at a glance the condition of the system without necessitating an opening of the box.

It is, then, an object of this invention to provide a unit, such as a terminal box, having a plurality of control devices in compact but accessible assembly.

A further object of the invention is the provision of an instrument box for an electrical control circuit which has control devices mounted therein in compact relationship for cooperation with other control devices mounted on a removable panel adapted to be completely separated from the box.

A still further object of the invention is to provide an instrument box with a sub-panel mounting for various electric control units which are placed in proper circuit relation by the mere act of inserting the panel in position in the box.

A still further object of the invention is to provide an improved instrument box for automatic foam control systems.

Still another object of the invention is to provide an instrument box adapted for mounting in the engineer's cab of a steam locomotive to not only house control units for an automatic locomotive boiler blow-off system but for also visually indicating to the engineer the condition of the boiler water in the locomotive boiler.

Another object of the invention is to provide a standard instrument box unit for automatic blow-off control systems which contains readily shiftable conductor links or bus bars which can be arranged as desired to adapt the unit for use with different types of systems.

Other and further objects of the invention will be apparent to those skilled in the art from the following detailed description of the annexed sheets of drawings which, by way of preferred example, illustrate one embodiment of the instrument box and one embodiment of a foam control system in which the box is useful.

On the drawings:

Figure 1 is a fragmentary side elevational view, with parts broken away in vertical cross section, to illustrate underlying parts of a locomotive equipped with a three-electrode foam blow-off system automatically controlled from the instrument box of this invention which is illustrated in dotted lines as mounted in the engineer's cab of the locomotive.

Figure 2 is a side elevational view of the instrument box.

Figure 3 is a front elevational view of the instrument box with the cover in closed position.

Figure 4 is a front elevational view of the instrument box with the cover in open position and with the detachable panel removed from the box.

Figure 5 is a plan view of the front face of the removed panel.

Figure 6 is a plan view of the rear face of the removed panel.

Figure 7 is a side elevational view of the removable or detachable panel, shown in Figures 5 and 6.

Figure 8 is a longitudinal cross-sectional view, with parts in elevation, taken along the line VIII—VIII of Figure 4.

Figure 9 is a view similar to Figure 8 but with the panel of Figure 7 mounted in position in the box.

Figure 10 is an enlarged longitudinal cross-sectional view, with parts in elevation, of the solenoid valve taken along line X—X of Figure 8.

Figure 11 is a horizontal cross-sectional view taken along the line XI—XI of Figure 10.

Figure 12 is a wiring diagram of the parts fixedly mounted in the instrument box and illustrating said parts somewhat diagrammatically.

Figure 13 is a wiring diagram of the parts on the detachable panel and illustrating such parts in somewhat diagrammatic form.

As shown on the drawings:

In Figure 1 the reference numeral 10 designates generally a locomotive having the usual boiler shell 11 defining a boiler course 12. A fire box 13 is provided in the rear end of the boiler and fire tubes such as 14 project forwardly from the fire box through the boiler course. The usual engineer's cab 15 is mounted around the rear end of the boiler.

An opening 16 is provided in the top of the boiler shell 11 and the opening is covered with the usual steam dome 17. A steam throttle pipe 18 or main outlet pipe to the operating cylinders of the locomotive extends upwardly at its inlet end into the steam dome 17.

The locomotive boiler contains boiler water B. W. to a level L. A steam space S. S. is provided above the boiler water and this steam space extends into the dome 17. Steam can thus flow through the upper portion of the boiler along the steam space S. S. into the dome 17 and thence into the upper end of the throttle pipe 18.

An open topped elongated box or trough 19 is suspended in the upper portion of the boiler and extends forwardly from the hottest portion of the boiler adjacent the fire box 13, under the steam outlet opening 16, to a point forwardly of the steam outlet. The box or trough 19 has a bottom, side walls and end walls which cooperate to provide an elongated channel or non-steam generating course in the steam space of the boiler. The side and end walls project into the steam space S. S. but terminate in spaced relation below the top of the boiler shell so as to place the entire interior of the box along its length in communication with the steam space.

As foam or light water develops above the level L in the boiler, it will be intercepted by the trough and spill into the trough so as to prevent entrainment with the steam entering the steam dome. As a result of this collection of foam or light water in the trough, a higher quality steam is delivered to the throttle pipe and foaming to a level sufficient to enter the throttle pipe is prevented.

The bottom portion of the trough 19 communicates with a drain pipe 20 discharging into an air pressure operated blow-off valve 21. The blow-off valve is mounted on top of the boiler shell 11 and discharges through a pipe 22 into a steam and water separator 23 also mounted on top of the boiler shell in front of the engineer's cab 15. Water freed from steam is drained from the separator to the road bed beneath the locomotive through a drain pipe 24. Steam flashed from the blow-off water is discharged from the separator through a steam outlet 25 in the top of the separator.

Air under pressure is supplied to the blow-off valve 21 for actuating the same through a pipe line 26. A compressed air tank T can be mounted on the locomotive for supplying the compressed air to a pipe line 26a which, as will be hereinafter explained, furnishes the compressed air to a solenoid operated valve which valve in turn can be opened to supply the air to the pipe line 26 and then to the blow-off valve 21.

Three electrodes 27, 28, and 29 project from the top of the boiler shell 11 into the steam space S. S. of the boiler. The electrode 27 is quite short and depends into the steam space to terminate a short distance beneath the boiler shell. The electrode 28 is somewhat longer than the electrode 27 and depends into the trough 19 preferably to a level just beneath the top of the trough. The electrode 29 is quite long and extends into the bottom portion of the trough 19.

The instrument box 30 of this invention is mounted on the rear wall 11a of the boiler in the engineer's cab 15, and contains electrical control devices in circuit arrangement with the electrodes 27, 28, and 29 and with an electric generator, battery, or other source of electric current 31. If desired a steam operated turbo-generator can be used to supply the electricity to the circuit. Such a generator can be conveniently driven by steam generated in the boiler.

The control devices in the box 30 not only give the engineer a visual indication of foam conditions in the boiler but also automatically effect the opening and closing of the blow-off valve 21 to discharge the foam out of the trough 19 whenever it is collected therein in sufficient amounts above predetermined levels.

As best shown in Figure 4, the instrument box 30 comprises a rectangular metal housing having side walls 32 and 33, a top wall 34, a bottom wall 35 and a rear wall 36. The metal housing, as indicated in Figures 1 and 2, is mounted in upright position on the rear wall 11a of the boiler and for this purpose apertured mounting flanges 34' and 35' are formed on the rear end of the box to project above the top wall 34 and below the bottom wall 35 respectively.

One of the side walls such as the wall 32 has hinge bosses 37 and 38 projecting laterally therefrom near the top and bottom ends thereof. The other side wall, such as the wall 33, carries a bracket 39 with laterally extending spaced apertured ears 39' receiving therethrough a swivel pin 40 and receiving therebetween a swing bolt 41.

A cover 42 having a pair of apertured ears 43 straddling the boss 37, and a second pair of apertured ears 44 straddling the boss 38, is hingedly connected to the box by means of pintles or bolts 45 extending through the ears and bosses. The cover 42 is adapted to close the open front of the box and the hinge arrangement is such that, when the cover is swung to open position, the entire front of the box will be exposed as shown in Figure 4. The cover has a furcated flange 46 on the free side thereof adapted to receive the swing bolt 41 for holding the cover in closed position.

The inner face of the cover has a peripheral groove 47 bounded by flanges which straddle the side and end walls of the box so as to seal the box when the cover is in closed position. If desired, a gasket could be mounted in this groove 47.

A somewhat thickened transverse portion 48 is also provided on the inner wall of the cover 47 to carry brackets 49 and 50 with spring arms so that spare fuses 51 and spare bulbs 52 can be carried in the cover. The cover thus serves as a spare parts carrier.

The cover is also apertured at three different locations to receive bull's-eye lenses 53, 54, and 55 for transmitting light from bulbs mounted in the box as will be hereinafter described to visually indicate to the engineer the foam condition in the boiler as well as the functioning of the foam control apparatus.

The top wall 34 of the housing has a boss 56 in which is secured the end of a pipe or conduit 57 for a cable C containing wires 27', 28', 29' and 31' from the electrodes and battery as shown in Figure 1. This cable enters the top wall 34 of the housing as best shown in Figure 4 and the various wires thereof are connected as indicated to the various posts of a binding post panel 58, mounted in the box at the upper end thereof.

As best shown in Figures 4, 8 and 9, the binding post panel 58 is carried on standards or supports 59 from the rear wall 36 of the box. This panel 58 is made of Bakelite or other insulating material and mounts eight binding posts 60. Some of the pairs of binding posts 60, as shown in Figure 4, are connected by means of links such as 61 and some of the binding posts 60 are grounded to the metal housing by means of a link such as 62. These links 61 and 62 can be switched around to adapt the box for use in different circuits as will be hereinafter more fully described.

The panel 58 also mounts the female member of an eight-circuit plug 63.

A fuse bracket 64 is also mounted on the panel 58 for carrying a fuse 65 in the spring arms thereof.

A switch $S_1$ is mounted on the inner face of the side wall 33 and this side wall is apertured to permit the switch handle $H_1$ to project therethrough for manual operation. As will be hereinafter more fully explained, the switch $S_1$ is an on and off switch to throw the circuit into and out of operation.

A second switch $S_2$ is mounted on the inner face of the side wall 32 and this wall is likewise apertured to receive therethrough the operating handle $H_2$ of the switch. This switch $S_2$, as will be hereinafter more fully explained, is a testing switch for the long and short electrodes 28 and 27 respectively.

As best shown in Figures 8 and 9, the bottom wall 35 of the housing has an apertured boss 35a thereon receiving a solenoid valve S. V. The solenoid actuator for the valve projects through the boss into the interior of the housing while the valve proper depends from the bottom of the housing and serves to control the flow of compressed air to the blow-off valve 21.

As shown in Figure 4, and as also shown in Figures 8 and 9, the lower corners of the housing have supporting blocks 66 formed therein and extending to a level beneath the open face of the housing. Threaded pins 67 project from the upper ends of these supports 66.

The lower pair of supports 59 for the panel 58 have threaded rods 68 projecting therefrom and carrying spacer sleeves 69 therearound. The spacer sleeves 69 terminate at the same level with the ends of the supporting blocks or bosses 66.

As shown in Figures 5, 6, 7 and 9, a removable panel 70 has apertures 71 in the corners thereof adapted to receive the threaded members 67 and 68 respectively so that the panel will rest on the supporting bosses 66 and the sleeves 69 respectively in the housing. Nuts 71' are threaded on these members 67 and 68. In this manner the panel 70 is readily mounted in position in the housing and can be quickly removed from the housing by mere removal of the nuts 71'.

A ground strap 72, as shown in Figure 5, can be secured to the panel 70 to surround one of the threaded members 67 and to receive the nut 71' tightly thereagainst for grounding the entire panel to the box.

Angle strips 73 and 74 can be welded or soldered to the front face of the panel 70 to act as light barriers to prevent light from any of the lamps 80, 81 and 82 from showing through any of the bull's-eyes 53, 54 and 55 not associated with the lamp which may at the time be lighted.

As also shown in Figure 5 the front or outer face of the panel 70 carries a fuse bracket 75 with spring clips receiving a fuse 76. The panel is apertured as at 77 and 78 to receive insulation grommets 79 permitting the passage of wires between the front and rear face of the panel. The panel is also apertured at 80, 81 and 82 to receive therein the socket collars of lamp sockets 83, 84 and 85. A still further aperture 86 is provided in the panel to receive the upper end of the male member of the plug 63. This male plug member can be held in the aperture 86 by means of two bolts passing through the panel 70.

A strap 87, secured to the panel 70, can be used as a handle to assist in removing panel 70 from the instrument box 30.

As shown in Figures 6 and 7, a time delay switch 90 is mounted on the rear face of the panel 70 together with three relay switches 91, 92, and 93. Seven binding posts 94 are also mounted on the panel 70 and project from the rear face thereof.

Links or bus bars such as 95 can be used to join various binding posts 94 for adapting the instrument box to various circuits.

As indicated in Figures 7 to 9, when the panel 70 is mounted in the housing on the supporting pins 67 and 68, the male member of the plug 63 will have the eight prongs thereof fitting into the corresponding receptacles in the female member of the plug 63 carried by the binding post panel 58. The time delay switch 90 and the relay switches 91 will fit into ample space provided in the housing as shown in Figure 9 so as not to interfere with the switches or binding post panel in any manner. Likewise the binding posts 94 and the links 95 of the panel 70 will clear the solenoid valve projecting into the housing.

As shown in Figures 10 and 11 the solenoid valve S. V. includes a cylindrical casing 100 which projects into the housing as shown in Figures 8 and 9 and which contains a sleeve 101. A solenoid operating coil 102 is disposed in the casing 100 around the sleeve 101. A base 103 is provided for mounting the casing and sleeve. This base can be secured to the boss 35a of the housing. A top wall member 104 covers the casing and is apertured to receive a plunger 105 with a threaded shank 106 projecting upwardly therefrom. A cap member 107 receives the shank 106 in threaded relation therewith and a locking nut 108 can be disposed above the cap around the shank 106 to lock the plunger at a fixed level.

The inner end of the plunger carries a plug 109 for seating the end of a coil spring 110. The coil spring acts against a movable plunger 111 controlled by excitation of the coil 102. The lower end of this movable plunger 111 projects into a valve casing 112 depending from the mounting base 103. The casing 112 has three ports 113, 114, and 115. The port 113 receives the pipe line 26a from the compressed air tank T. The port 114 receives the pipe line 26 to the blow-off valve 21.

The port 115 is a bleeder port adapted to exhaust compressed air from the pipe line 26.

Air from the pipe line 26a enters a chamber 116 of the casing 112. This chamber contains a valve seat 117 with a bore therethrough communicating with a second chamber 118 having the port 114.

A third chamber 119 containing the port 115 is provided with a second valve seat 120 having a passageway therethrough in alignment with the passageway in the port 117 and also communicating with the chamber 118.

A valve 121 is carried by the movable plunger 111 and is adapted to seat on the seat 117 for closing the passageway therethrough. A second valve 122 is mounted in the chamber 119 and is adapted to seat on the seat 120 for closing the passageway of this seat. The valve 122 can be carried on a spring urged plunger 123 seated in an end cap 124 at the bottom of the casing.

A ribbed or longitudinally grooved spacer pin 125 is slidably mounted in the aligned bores or passageways of the seats 117 and 120 for engaging the valves 121 and 122.

When the solenoid coil 102 is energized the plunger 111 is drawn against the spring pressure 110 into the sleeve 101 therby unseating the valve 121. This permits the spring acting on the valve 122 to close the valve 122 so that communication will exist between the pipes 26a and 26 thereby permitting the flow of compressed air to the blow-off valve and opening the valve to discharge the collected light water and foam out of the trough 19. When the coil 102 is de-energized, the spring 110 will seat the valve 121 thereby forcing the pin 125 against the valve 122 to open this latter valve. The pipe line 26 will thereby be in communication with the bleeder chamber 119 and port 115 to exhaust air from the blow-off valve and permit the valve to close.

The supply of air under pressure to open the blow-off valve, the shutting off of this supply, and the venting of the air in the valve to the atmosphere, is thus automatically accomplished by the solenoid valve.

As shown in Figure 3, the outer face of the cover 42 can have a name plate 130 bolted thereon and apertured in alignment with the apertures in the cover to expose the various bull's eyes therein. The plate 130 preferably bears legends such as "Unsafe foam" under the bull's-eye 55; "Blowing" above the bull's-eye 54; "On" and "Off" opposite the switch handle $H_1$; "Test switch" opposite the switch handle $H_2$; "Short" above the switch handle $H_2$; and "Long" below the switch handle $H_2$. The bull's-eye 53 can have the legend "On" directly thereon.

The switch handle $H_1$, when moved to the "On" position places the system in operation. With the switch handle $H_1$ in "On" position the bull's-eye 53 will light up.

The "Test switch" handle $H_2$ is for handy testing of the apparatus to determine whether or not the system is in proper working condition. When the switch handle $H_2$ is moved to the "Short" position, both bull's-eyes 54 and 55 should light up and the blow-off valve should open. When the switch handle $H_2$ is moved to the "Long" position, the bull's-eye 54, after a time delay, should light up and the blow-off valve should also open. This gives the engineer a quick check on the operation of the system to determine whether or not it is in proper working order. The switch handle $H_2$ is normally in the middle position as shown in Figure 3 and need not be operated for automatic functioning of the system.

The wiring diagram of Figure 12 illustrates the connections to the female plug member 63 on the binding post panel 58 of the instrument box. As therein shown, one link 61 connects the post wired to the positive side 31' of the battery 31 with the post wired to the positive side of the generator. A second link 61 connects the post wired to the ground with the post wired to the negative side of the battery. Another post, marked "Gen.—," as shown, is wired through the fuse 65 with the last mentioned post on the negative side of the battery. All electrical energy is supplied from the generator when the links 61 are in place. When the links 61 are removed the battery is used to supply energy for the coils of relays 91, 92 and 93 while the generator is used to supply energy for the coils of the delay switch 90 and the solenoid valve S. V., as well as for the lights 80, 81 and 82.

The various wires from the electrodes and from the battery and ground are connected to the binding posts as indicated. The wires from the binding posts are all combined in a cable and lead to the switches $S_1$ and $S_2$. The "On" position of the switch $S_1$ connects the binding post panel with the solenoid valve. The "Short" and "Long" positions of the switch $S_2$ connect various circuits to effect a testing operation of the "Short" and "Long" electrodes as well as the operation of the solenoid valve.

As shown in the removable panel wiring diagram of Figure 13, the male member of the plug 63 has all of the prongs connected with wires from a cable and the various control devices receive corresponding wires from this cable. Various binding posts 94 are connected through the links 95 for proper circuit arrangements of the illustrated three-electrode system. If a two-electrode system is used, the connecting links are rearranged to disengage the corresponding control devices for the eliminated electrode.

When foam or light water spills into the trough 19 and reaches a level sufficiently high to contact the extra long electrode 29, no current flows, as a relay switch contained in relay 93 is open. As the foam level rises into contact with the long electrode 28 current will flow through relay 92 to close its switch thereby causing current to flow through the heater coil of time-delay switch 90. After a time delay, contacts of time-delay switch 90 will close, causing current to flow through relay 93 to close two of its switches and open one of its switches, thereby feeding current to the solenoid coil for opening the valve and to the light for bull's-eye 54 to indicate that the system is discharging foam, feeding current through relay 93 and the extra long electrode to act as a holding circuit for relay 93, and breaking the circuit to heater coil of time-delay switch 90, thereby causing its contacts to open. Current will continue to flow through relay 93 until the level of foam in trough 19 subsides below the end of electrode 29, thereby breaking the holding circuit of relay 93 and permitting relay 93 to open, thereby breaking the circuit to the solenoid to close the valve and opening the circuit through the light for bull's-eye 54.

When foam rises to a level sufficient to contact the short electrode 27 a third relay 91 is energized. This relay when closed effects the energizing of relay 93 and lighting of the light for bull's-eye 55, thereby indicating to the engineer that the foam has reached an unsafe level in the boiler. The energizing of relay 93 causes the closing of two of its switches and the opening of one of its switches, thereby causing opening of the solenoid valve, lighting of light for bull's-eye 54, closing of a holding circuit for relay 93, and opening of the time-delay switch heater circuit, all as hereinbefore described. If bull's-eye 55 remains lighted for an appreciable length of time, the engineer should blow off the boiler through the manual means usually provided on a locomotive. When the foam level subsides away from the short electrode 27 relay 91 will be deenergized, thereby shutting off the light to bull's-eye 55. However, the solenoid valve will not be closed because it will be receiving current through relay 93 and will remain open and light the bull's-eye 54 will remain lighted until relay 93 is de-energized by foam level subsiding beneath long electrodes 29, thereby opening holding circuit of relay 93.

In a three-electrode system, therefore, the foam, light water and other impurities in the collecting trough first contact the extra long electrode 29 and, upon rising into contact with the long electrode 28 after a time delay, the closing of a circuit is effected to open the blow-off valve and to light the bull's-eye 54 thereby indicating that the system is blowing off. If foam development is quite rapid and rises to a still higher level so as to contact the short electrode 27, an additional circuit is energized to light up the bull's-eye 55 and thereby indicate to the engineer that bad foaming conditions exist in the boiler. If the top bull's-eye 55 remains lit for an appreciable time, the engineer may open a manually controlled blow-off for effecting a more rapid subsiding of the foaming conditions.

The top electrode, or short electrode, is useful as a safety device in the event that the long electrode 28 does not initiate the blow-off. Once the blow-off has been started by either or both the short and long electrodes, the blow-off will continue until the foamy water subsides below the level of the extra long electrode. Upon dropping away from the extra long electrode, the circuits will all be broken and the blow-off valve will close, but the level of impurities in the trough will be near the bottom of the trough so that a clear steam channel is provided to the steam outlet.

It will, of course, be understood that various details of the invention may be varied through a wide range without departing from the principles of this invention and it is, therefore, not the purpose to limit the patent granted hereon otherwise than necessitated by the scope of the appended claims.

We claim as our invention:

1. An instrument box for an automatic electrode-actuated foam control system which comprises a housing, a binding post panel fixedly mounted in said housing, binding posts on said panel adapted to be placed in electrical connection with the electrodes of the system and with a source of electrical current, conductor links adapted to connect various of said binding posts in accordance with the particular foam control system with which the box is used, a removable panel, electrical system controlled units mounted on said removable panel, and shiftable conductor links on said removable panel for varying the connections between the electrical control units in accordance with the particular foam control system.

2. A terminal box for an electrical system comprising a rear wall; peripheral walls extending around a margin of said rear wall to define an open front housing; an apertured cover for closing the open front of said housing; a first panel in said housing in spaced relation to said rear wall with one edge adjacent a peripheral wall; a second panel removably mounted in said housing with one end portion overlying the first panel and its other end adjacent an opposite peripheral wall; coacting devices on the overlying portions of said panels for removably supporting said second panel; supports for removably mounting the other portion of said second panel; separable plug parts on proximate portions of said panels adapted for disengagement upon removal of the second panel; and indicators on the second panel registered with the cover apertures to be visible therethrough.

3. A terminal box for an electrical system comprising a rear wall, top and bottom walls, and side walls, said walls together defining an open front housing; an apertured cover for closing the open front of said housing; a first panel in the upper portion of said housing in spaced relation to the rear wall; electrical devices mounted on said first panel; a second panel removably mounted in said housing to extend below said first panel to the bottom of the housing thereby to divide the interior of the housing into separate front and rear sections; coacting devices on proximate portions of said panels for removably mounting the upper portion of said second panel on said first panel; and supports in the lower portion of the housing for removably mounting the lower portion of said second panel; separable plug parts on confronting proximate portions of the respective panels adapted for disengagement upon removal of the second panel; indicators on the front of said second panel registered with the apertures in said cover; and means in the bottom portion of the housing for receiving a device that has separable members one of which members is accessible for removal from the exterior of the housing.

4. A terminal box for an electrical system comprising a rear wall; peripheral walls extending around the margin of said rear wall to define an open front housing; an apertured cover for closing the open front of said housing; a first panel in the upper portion of said housing mounted upon supports projecting forward from the rear wall thereof to position said first housing in spaced relation thereto; electrical devices on front and rear faces of said first panel; a second panel removably mounted in said housing to extend below said first panel to the bottom of said housing thereby to divide the interior of the housing into separated front and rear sections; the upper portion of said removable panel mounted on supports projecting forward from the lower portion of the first panel; electrical devices on the front and rear faces of said second panel and extending into the respective front and rear sections of the housing; supports for removably mounting the lower portion of said second panel; separable plug parts on proximate portions of the respective panels adapted to be disengaged upon removal of said second panel; indicators on the front of said second panel registered with apertures in the cover; and means in the bottom of said housing for receiving a device having a separable portion that is accessible for removal from the exterior of said housing.

5. A terminal box for an electrical system comprising a plurality of walls providing an open front housing; an apertured cover normally closing the open front of the housing; separate front and rear panels mounted in said housing in spaced relation to each other, one of said panels being fixedly mounted in the upper portion of the housing, the second panel being removably mounted in overlying relation to the other panel and supported at one end by said first panel; supports in an opposite portion of said housing for mounting the adjacent end of the removable panel; separable plug parts on proximate portions of the respective panels adapted for disengagement upon the removal of the second panel; electrical devices on the removable panel adapted for removal with said panel; and indicators on one of said panels registered with the apertures in said cover.

JAMES H. STARR.
EDWARD A. GOODNOW.